United States Patent
Rao et al.

(10) Patent No.: US 9,443,368 B2
(45) Date of Patent: Sep. 13, 2016

(54) E-PAPER BASED DIGITAL DOCUMENT DISPLAY DEVICE THAT RETRIEVES UPDATES AUTOMATICALLY

(76) Inventors: Bindu Rama Rao, Laguna Niguel, CA (US); Madhavi Jayanthi, Laguna Niguel, CA (US)

( * ) Notice: Subject to any disclaimer, the term of this patent is extended or adjusted under 35 U.S.C. 154(b) by 1118 days.

(21) Appl. No.: 13/477,053

(22) Filed: May 22, 2012

(65) Prior Publication Data

US 2012/0229440 A1 Sep. 13, 2012

Related U.S. Application Data

(63) Continuation-in-part of application No. 13/369,292, filed on Feb. 8, 2012, which is a continuation-in-part of application No. 12/156,813, filed on Jun. 5, 2008, now Pat. No. 8,150,909.

(51) Int. Cl.
| | |
|---|---|
| *G06F 17/00* | (2006.01) |
| *G07F 7/10* | (2006.01) |
| *G06F 3/0483* | (2013.01) |
| *G06F 1/32* | (2006.01) |
| *G06Q 10/10* | (2012.01) |
| *G06Q 20/34* | (2012.01) |
| *G07F 7/08* | (2006.01) |

(52) U.S. Cl.
CPC ........... *G07F 7/1008* (2013.01); *G06F 1/3206* (2013.01); *G06F 1/3234* (2013.01); *G06F 3/0483* (2013.01); *G06Q 10/10* (2013.01); *G06Q 20/3574* (2013.01); *G07F 7/0806* (2013.01); *Y04S 50/12* (2013.01)

(58) Field of Classification Search
CPC ............................. G06F 1/3106; G06F 3/0483
USPC .......................................................... 715/273
See application file for complete search history.

(56) References Cited

U.S. PATENT DOCUMENTS

| | | | | |
|---|---|---|---|---|
| 8,688,517 B2* | 4/2014 | Lutnick | .................. | G06Q 30/02 705/14.1 |
| 2003/0135288 A1* | 7/2003 | Ranganathan | ........ | G06F 1/3203 700/22 |
| 2006/0290691 A1* | 12/2006 | Sato | ........................ | G06F 3/147 345/211 |
| 2007/0247422 A1* | 10/2007 | Vertegaal | ................ | G06F 3/017 345/156 |
| 2008/0034238 A1* | 2/2008 | Hendry | .................. | G06F 1/3203 713/323 |
| 2009/0184821 A1* | 7/2009 | Kuris | .................. | G08B 21/0461 340/541 |

\* cited by examiner

*Primary Examiner* — Laurie Ries

(57) ABSTRACT

A digital document display device capable of displaying a document, retrieving updates, sharing locally with other devices, managing document displays in other digital document display devices in proximity, etc. A e-paper based display unit of the digital document display device is configured to read and display the display image. A motion detector unit helps detect human motion, so that the digital document display device may be set to a low power mode, or powered off, etc. if no humans are detected in the vicinity. A renewable energy power unit is also provided.

12 Claims, 6 Drawing Sheets

E-PAPER BASED DIGITAL DOCUMENT DISPLAY DEVICE THAT RETRIEVES UPDATES AUTOMATICALLY

CROSS REFERENCES TO RELATED APPLICATIONS

The present patent application is a continuation-in-part of U.S. non-provisional patent application Ser. No. 13/369,292, entitled "DIGITAL PLAQUE THAT DISPLAYS DOCUMENTS AND UPDATES PROVIDED BY A PLAQUE MANAGEMENT SERVER", filed on Feb. 8, 2012, which is itself a continuation-in-part of U.S. non-provisional patent application Ser. No. 12/156,813, entitled "DIGITAL PLAQUE FOR DISPLAYING CERTIFICATES, ASSOCIATED DOCUMENTS AND CURRENT STATUS", filed on Jun. 5, 2008 now U.S. Pat. No. 8,150,909. The complete subject matter of each of the above-referenced United States Patent Applications is hereby incorporated herein by reference, in its respective entirety.

BACKGROUND

1. Technical Field

The present invention relates generally to a plaque that is used by a user to display a document or certificate, and particularly to a e-paper based solution wherein a digital plaque makes it possible to display one of a collection of documents, transcripts, licenses, achievement awards, etc.

2. Related Art

Plaques are often used for employee recognition. Plaques can be ordered on the Internet and a user can select a type of frame—word, metal, plastic, etc. The user can upload a customized artwork and photos and they get engraved on the plaques ordered. Quite often, an employee hangs several plaques on the walls of his workspace. In addition, some users display the plaques on their desk at work. Quite often employees run out of space and cannot display new ones on the walls or the desks. Plaques are provided to employees of a company to commemorate an event, to appreciate work done, etc. Plaques are provided when patents are issued, and for graduation too. Quite often employees run out of space to display the plaques provided to them.

Users sometimes have information engraved on a plaque that later on becomes outdated. Users have no way to modify the plaques and they have to order new ones at considerable expense. Outdated plaques are usually discarded and new ones ordered. Often users need to duplicate or copy the information available on a plaque. They often use a photocopier to make a copy, which usually does not look clean or clear when photocopied.

A typical dentists office displays over 20 plaques of various kinds in the waiting room, some of them displaying a license to operate, other displaying educational certificates, some displaying testimonials, etc. Often, rearranging these plaques, especially when new ones have to be added, is a headache. Just shuffling the order of display is a chore. Even changing the order in which plaques are arranged is a chore. When an update to a document displayed is received, replacing the old one with a new one is a headache requiring over 30 minutes of work.

Users typically forget when their license to operate a business expires. The plaques fail to remind them of these expiry dates. Inventors who frame their patents also often forget to pay the maintenance fees due, and end up having their patents abandoned. They also forget when their patents expire, etc.

Students get transcripts from their schools/colleges and they would want to frame them and put them up on a wall. When they get a more recent/updated transcript, they often take it down, replace the old document with the new one, and nail them back on a wall. This process is laborious and not easy for the elderly. Professionals such as doctors and engineers acquire a license to operate, and they often put them up on a wall as a plaque. However, when these licenses are renewed, they need to get new plaques made, at considerable expense of money and time, to put them up on a wall in their offices. Again, this activity is time consuming and expensive.

Some writers who get a book published often get a plaque made of their book cover and display the plaque. When a new version/edition of the book is subsequently released, the old plaque becomes obsolete and the writers get new plaques made to replace older ones, at some expense of time and money. This is inconvenient and there is a need to display updated/recent editions for book covers in more convenient methods.

Often people make a poster or a plaque that also comprises a photo of one or more individuals, such as a school graduation photo of a high school student. Years later, that student will have forgotten who his friends are in that photo, and will have lost touch with them. There is no easy way today to determine who those various friends are and what they are currently doing, or where they live, without going through considerable time and expense to determine that information.

Sometimes inventors apply for a patent and get a plaque made when they get a patent granted (or when they apply for it), and put the plaque on a wall in their office. The patents need maintenance fees to be paid periodically, and the inventors have no easy way to determine when these fees are due, and some of these patents get abandoned. Thus, there is a need to determine/display the various status of a patent or a patent application so that an inventor can act upon it, and there is no easy way today to do that currently, even though an inventor can put up a plaque that might remind him of the need to check the status once in a while by calling into the patent office (such as USPTO) or searching online.

Quite often people frame a old photo that shows faces of multiple individuals. Years later, a user might want to determine what those individuals in the photo are currently doing, or even try to remember their names or their relationships to his own life. If the user has very little recollection of his friends, then there is no easy way for him to determine their names, their current profiles or their whereabouts. Thus the user has no way to get in touch with those individuals.

In most companies, rewarding hard working employees is a great way to keep them motivated and feeling valued in the workplace. Companies provide numerous products perfectly geared towards accomplishing this mission, including personalized corporate awards and gifts, wooden, acrylic, and crystal plaques, star trophies and paperweights, desk name plates, globe awards, clocks, wine box sets, and barbeque sets. These are great gifts to give employees, such as to reward individuals who have met personal or corporate set goals, or to recognize certain workers whose accomplishments stand out among the other workers. Personalization makes them a greatly appreciated gift that any employee will treasure forever. However, information engraved, printed or otherwise displayed on traditional gifts cannot be updated, changed, revised. This is sometimes a problem.

In 2012, some news on e-Paper had been announced in a couple of newspapers. E-Paper is an application that can use several alternative technologies, such as electrophoretic, cholesteric LCD, electrochromic and nematic bistable LCD. These different technologies bring different advantages and drawbacks in terms of their features and their manufacture. Like OLEDs, e-paper is light in weight and has even lower power requirements. The characteristics of ultra-thinness and flexibility really make e-paper different to current displays. E-paper is a portable, reusable storage and display medium, typically thin and flexible. It is literally the electronic substitution for the printed page. Typically it reproduces mainly static text, usually monochrome, with high flexibility of the whole screen so ultimately it may even be folded or rolled like traditional paper. This implies being produced as a thin film, rather than as a panel, like LCD or plasma FPDs. However, e-paper is a technology in need of a solution. There are no products in the market currently. Researchers have not yet figured out how to use them, or what to use them for.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
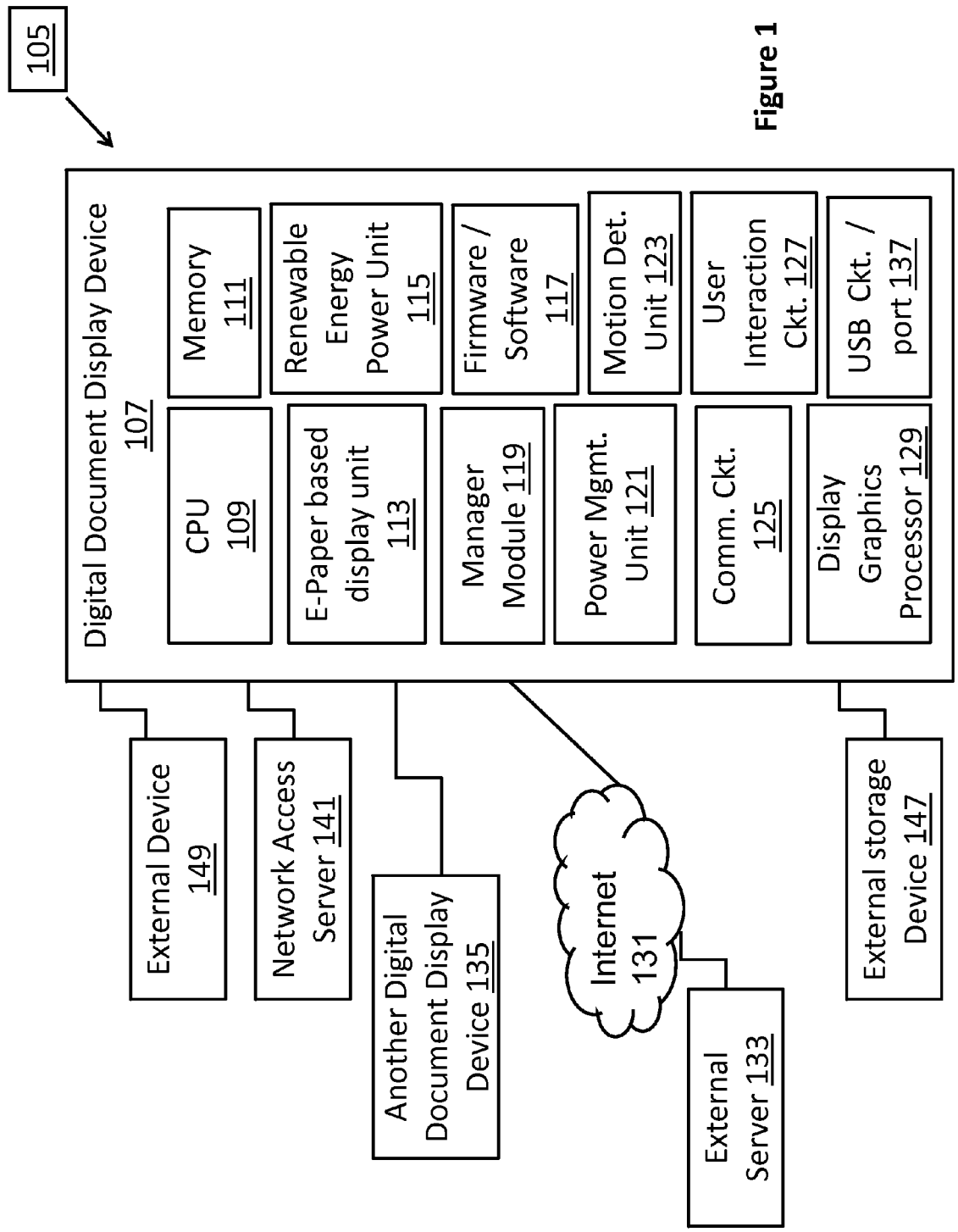
FIG. 1 is a schematic block diagram of an exemplary digital document display device capable of displaying a document, retrieving updates, sharing locally with other devices, managing document displays in other digital document display devices in proximity, etc.

FIG. 1 is a schematic block diagram of an exemplary network 105 with a digital document display device 107 capable of displaying a document, retrieving updates, sharing locally with other devices, managing document displays in other digital document display devices in proximity, etc. The digital document display device 107 comprises a central processing unit (CPU) 109, a memory 111, an e-paper based display unit 113 and a renewable energy power unit 115 that provides operational power as needed. The CPU 109 is operable to execute a manager module 119 that manages the acquisition, storage and display of a first digital document based on one of a plurality of operational modes and user selection of the first digital document. The CPU sets the digital document display device in one of a plurality of operational modes as instructed, while displaying the first digital document. A power management unit electrically coupled to the CPU, the memory, the e-paper based display unit and the renewable energy power unit modifies the power consumption of the digital document display device based on the selected one of a plurality of operational modes.

In one embodiment, the e-paper based display unit 113 is a flexible and reflective electrophoretic display (EPD) that uses electrophoresis to switch pixels or segments on and off; and the manager module 119 displays the first digital document such that its image content, contrast, reflectance, and viewing angle, are maintained even when the digital document display device 107 is turned off or is set to low power mode. It may be produced as a thin film, rather than as a panel. There are several technologies that offer e-paper properties. In one related embodiment, the e-Paper is produced from a flexible form of the current TFTLCD with bendable substrates in plastic or even stainless steel. E-paper technologies also offer a further key important feature, in that ambient lighting may be used for reading, via its reflective properties, in which characters appear as black or a dark colour on white in a flexible substrate. Moreover, the image may remain in place without power, with duration depending on the technology—from minutes to hours. In a related embodiment, it displays mainly static text, usually monochrome, with high flexibility of the whole screen.

In one embodiment, the digital document display device 107 also comprises a user interaction circuitry 127 that captures user triggers to power up the digital document display device 107, change the document displayed, retrieve updates to the document currently displayed, present the retrieved updates, and other user generated triggers. The CPU 109 sets a timer that subsequently wakes up the digital document display device 107 from a sleep mode or a low power operational mode at the end of the timer value. The CPU 109, on wakeup from the sleep mode or the low power operational mode, selects a next document to display from a plurality of documents, retrieves it and displays it, wherein the selecting occurs based on random selection or based on a sequential selection order. User interaction supported include management of the digital document display device 107, selection of documents, configuring a selection of documents that are displayed in some order, such as a round-robin order, random order, preset order, etc. User interaction support extends to management of other digital document display device in communicative proximity (over Wifi or Bluetooth, for example), such as another digital document display device 135. It also comprises assigning documents for display on the another digital document display device 135, configuring update retrieval and display for currently displayed documents, using the digital document display device 107 as a proxy for some operations, etc.

In a different embodiment, a display graphics processor 129 in the digital document display device 107 communicatively coupled to the e-paper based display unit 113 drives the display of documents. The display graphics processor 129 is a GPU or a VPU in some embodiments, and is integrated into the CPU 109 in one embodiment. The memory 111 (or alternatively, a memory unit dedicated to storing a document to be displayed) that stores a plurality of documents also facilitates storage, retrieval and replacement of documents, their status, associated content, information on a document context, etc. The CPU facilitates the display of documents, with the GPU (for example) providing video and graphics display and manipulation functionality. The user interaction circuitry 127 captures user triggers to power up the digital document display device, to change the document displayed, to select a specific one of the plurality of documents, to retrieve updates and to present updates, etc. It provides features that support various kinds of user interaction. The CPU 109 instructs the display graphics processor 129 to display the specific one of the plurality of documents, wherein the plurality of documents is stored in the memory 111, in a secondary storage (not shown), in a network access server (NAS) 141 in a local network, etc. The display graphics processor 129 controls and manages the display of the specific one of the plurality of documents on the e-paper based display unit 113 as instructed by the CPU 109. The CPU 109, based selectively on the user triggers received from the user interaction circuitry 127, wakes up if it is in low power operational mode when it receives user generated trigger, processes user requests to display a document or change a document being displayed, and moves into a low power operational mode again after initiating the display.

In a different embodiment, the e-paper based display unit 113 is a flexible OLED based display that needs current to maintain images on display. A motion detection unit 123, communicatively coupled to the CPU 109, detects motion of humans in proximity. The CPU 109 sets the digital document display device 107 (or the e-paper based display unit 113 in one related embodiment) in one of a plurality of low power operational modes when no human is detected in its vicinity by the motion detection unit, and sets the digital document display device 107 in one of a plurality of normal operational modes when at least one human is detected in its vicinity by the motion detection unit. In a related embodiment, a liquid crystal display (LCD) based e-paper based display unit 113 displays a document and the motion detector unit 123 (also referred to as the motion detector circuitry sometimes) comprises one or more of a passive infra red (PIR) sensor unit that detects whether a human has moved in or out of the PIR sensor unit range, and a micro wave sensor capable of detecting human presence employing microwave technologies. The PIR sensor unit comprises an infrared sensor configured for detecting infrared light, and is capable of generating, for example, a first detecting signal when any infrared light is detected, and generating a second detecting signal when the detected infrared light is no longer detectable.

In one embodiment, the digital document display device 107 also comprises a communication circuitry 125 communicatively coupled to the CPU 109 and a USB circuitry/port 137 communicatively coupled to the CPU 109. The CPU 109 displays the first digital document after it is retrieved or received from a second digital document display device, such as the another digital document display device 135, communicatively coupled to the digital document display device employing the communication circuitry 125, from an external storage device 147 communicatively coupled to the digital document display device 107 via the USB circuitry/port 137, or from an external scanner device (not shown) communicatively coupled to the digital document display device 107 via the communication circuitry 125 or the USB circuitry/port 137.

In another embodiment of the digital document display device 107, the first digital document comprises an associated status that changes over time, and provides references to an associated context, deadlines, event information, supplementary information, other related documents, training material, and media. The CPU 109, based on user selection (for example, from a list of available documents, from a table of documents and associated supplementary information, from a web page of documents, from a photo album, etc.), retrieves and displays on the digital document display device one or more of the associated context, deadlines, event information, supplementary information, other related documents, training material, and media.

The first digital document comprises an associated status that changes over time and is one of an award, a recognition, a score card, a transcript, a document, a sales deed, a ticket, a poster, a document cover, a book cover, a patent, a photo and a graduation record. In one embodiment, the selection of a document for display by a user automatically retrieves and displays one or more of the associated context, deadlines, event information, supplementary information, other related documents, training material, and media.

In another embodiment of the digital document display device 107 the digital document display device 107 also comprises an audio player circuitry (not shown) and an audio data. The CPU 109, during operation facilitates the playing of the audio data using the audio player circuitry during the display of the digital document.

In a different embodiment, digital document display device 107 comprises the communication circuitry 125 for interacting with a second external device, such as the external device 149, 133, 147 141, to receive the document for display. It manages the documents in the second external device 149. The CPU 109, during operation, receives or retrieves the digital document from the second external device 149 via the communication circuitry 125. For example, in one embodiment, a scanner/printer, capable of scanning a document, provides a scanned image of a document for display on the e-paper based display unit 113 of the digital document display device 107.

In yet another different embodiment, the digital document display device 107 is communicatively coupled to another digital document display device 135 in proximity. The manager module 119 manages the display of a second digital document on the another digital document display device 135 by assigning the second digital document for display on the another digital document display device 135, configuring the display of the second digital document on the another digital document display device 135, and configuring retrieval and presentation of an update to the second digital document on the another digital document display device 135.

The manager module 119 is part of a firmware/software 117 although it can be logic embedded in a custom ASIC chip too. The manager module 119 and the firmware/software 117 are located in the memory 111 in some embodiments, while it is part of a control logic embedded in EEPROM or DRAM chip (for example) in some other embodiments. The manager module 119 is a downloadable application in one embodiment that executes over the firmware/software 117 and utilizes the user interaction circuitry 127 to solicit user response to prompts, queries, input requests, multiple selection boxes, dialog boxes, etc.

The digital document display device 107 is capable of discovering other devices that are in communicative proximity, such as the another digital document display device 135. On discovery, it is capable of adding them to a group of display devices that need to be managed, that need to be assigned documents to be displayed, etc. In addition, new display devices can communicate a request to join a group managed by the digital document display device 107. In one embodiment, a new device communicates a request to join and to be managed, to the digital document display device 107, which then adds it to a group of devices to be managed, prompts a user to add the new device to one or more specific groups, prompts the user to select a document (at least one document, for example) to be displayed on that new device (from a list of documents available, for example), sets a default schedule for retrieving updates for that document, etc. Thus, the digital document display device 107 is used by a user to manage one or more groups of display devices, each assigned one or more documents to be displayed in some order (random, a round robin order, or a user specified order, etc.). The new device is capable of retrieving documents and updates to document itself (employing its own communication means) or by using the digital document display device 107 as a proxy—this behavior is controlled by configuration information and can be changed as necessary.

In one embodiment, the new devices assigned a document to be displayed (such as a document image retrieved from a scanner or a camera circuitry, employing a paper document as the original source) can be subsequently provided with an authenticated document image from the organization or institution in charge of distributing the paper documents. The authenticated document image(s) are verified by the user after they are received, for example, by online verification of a digital signature provided for that document. Thus, a user can obtain digital versions of paper documents for display purposes that can be verified online as being authentic, or original. The digital document display device 107 facilitates digital signature verification for documents displayed, if necessary. In a related embodiment, a search window is provided by the digital document display device 107 soliciting particulars of the paper document—the name or other identification of the document, the details of the organization or institution in charge of distributing the paper documents, the applicable date(s), and any other particulars associated with the document type (different types of documents are supported, and different parameters are prompted based on document type for example). The collected user inputs are sent to a server in one related embodiment for retrieval of the digital version of the document, and payments for such retrieval are also supported in another related embodiment, wherein the user is prompted to pay fees/charges to obtain a digitally signed, verifiable digital document from the original source/organization or institution in charge of distributing the paper documents.

Figure 2:
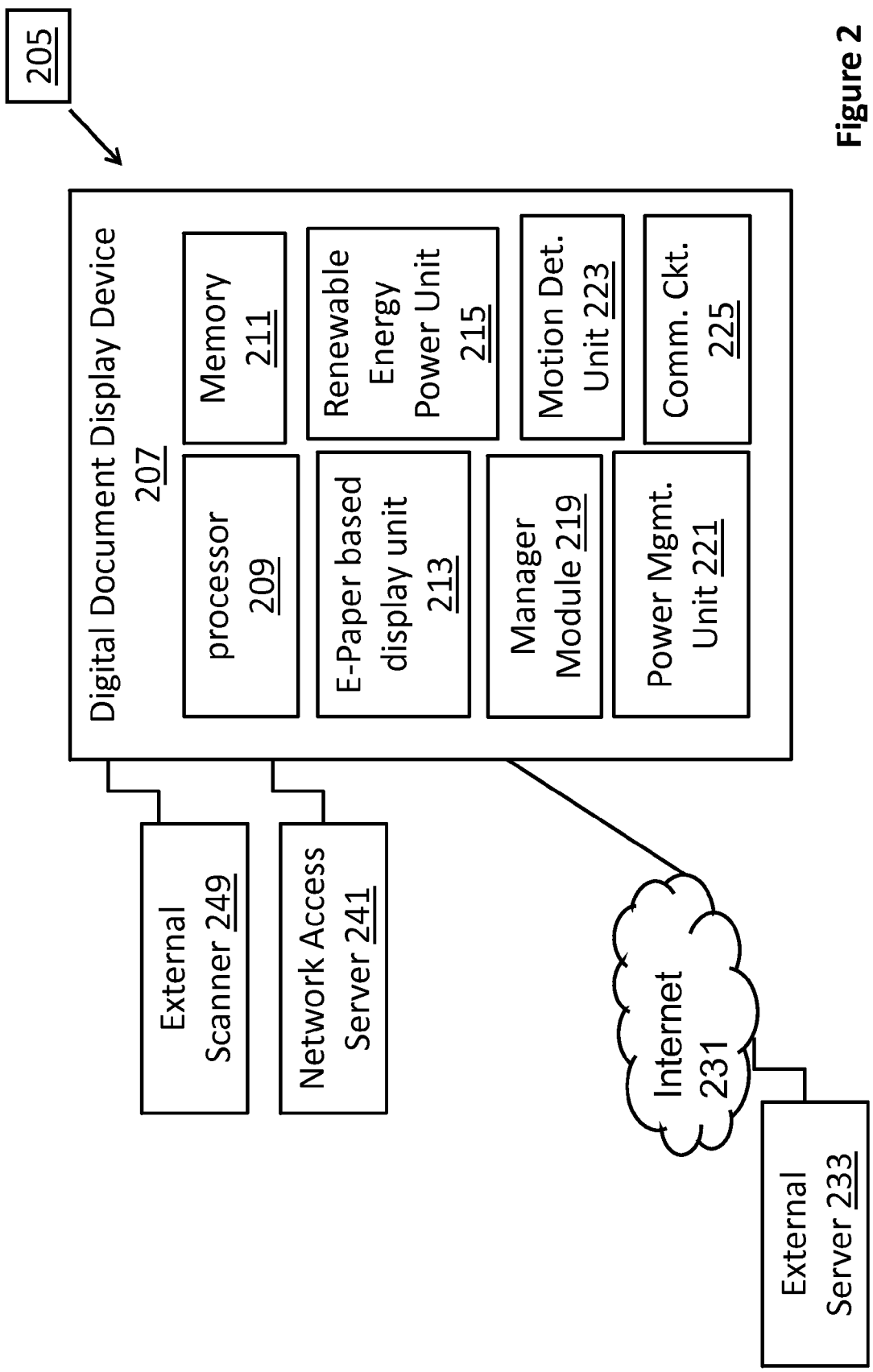
FIG. 2 is a schematic block diagram of an exemplary digital document display device comprising a processor, a memory, an e-paper based display unit, a renewable energy power unit and a motion detection unit to detect motion of humans in proximity.

FIG. 2 is a schematic block diagram of an exemplary digital document display device 207 comprising a processor 209, a memory 211, an e-paper based display unit 213, a renewable energy power unit 215 and a motion detection unit 123 (or motion detection circuitry 219) to detect motion of humans in proximity. The processor 209 sets at least the e-paper based display unit in one of a plurality of normal operating modes (default resolution mode, high resolution mode, etc.) and displays a first document when at least one human is detected in its vicinity by the motion detection unit 223; and the processor 209 sets at least the e-paper based display unit 213 in one of a plurality of low power operating modes when no human is detected in its vicinity by the motion detection unit 223. Thus, using the motion detection unit 223, the digital document display device 207 makes it possible to manage and lower overall power consumption, turning of components not needed, until they are needed, turning on components as they are needed, lowering resolution to conserve power as needed, increasing resolution when there is no anticipated shortage of power (or adequate power being generated by the renewable energy power unit 215), etc.

A power management unit 221 is electrically coupled to the processor 209, the memory 211, the e-paper based display device 213 and the renewable energy power unit 215. The power management unit 221 modifies or turns off the power supplied to the various components of the digital document display device 207 based on the one of a plurality of operating modes assigned or set by the processor 209 (for example based on current conditions, based on user preferences and instructions, etc.). A communication circuitry 225 facilitates interaction with at least one server, such as an external server 233, such as over Internet 231 or a local area network. The processor 209, operable to execute a manager module 219, retrieves an updated status for the first digital document employing the communication circuitry 225 and displays it along with other related documents, supplementary information, and contextual information. The manager module 219 selectively presents a prompt to the user recommending or soliciting at least one user input or user action selection, gathers a user response and conducts a user specified operation based on the user response.

The e-paper based display unit 213 of in one embodiment comprises a liquid crystal panel having a pixel array and a gate driver unit for generating a plurality of driving signals to drive the pixel array. The gate driver unit is disposed on the liquid crystal panel such that it provides driving signals to drive the pixel array. A clock generator is electrically coupled to the gate driver unit. An output of the clock generator is managed to adjust driving signals generated from the gate driver unit. A controllable power management unit is electrically coupled to the gate driver unit and the clock generator. The power management unit 221 is capable of adjusting power consumption by the e-paper based display unit 213 enabling a user to trade image quality for power consumption, for example.

In one embodiment of the digital document display device 207, the power management unit 221 is communicatively coupled to the e-paper based display unit 213, the processor 209, the renewable energy power unit 215 and the motion detection unit 223. It determines any need to conserve power consumption and triggers the processor 209 to display the first digital document at a lower resolution if there is need to conserve power or lower power consumption. The power management unit 221 determines an availability of adequate power and triggers the processor 209 to display the first digital document employing a default resolution or a higher resolution.

In a different embodiment, the renewable energy power unit 215 is disposed along or disposed on one or more surfaces of the digital document display device 207. The motion detection unit 223 is disposed on a frontal surface to detect motion of humans in proximity. The motion detection unit 223, on detecting motion of humans, triggers the processor 209 to activate the display of the first digital document if the e-paper based display unit 213 has been turned off or has been placed in a low power mode. The renewable energy power unit 215 triggers the processor to turn off the e-paper based display unit or place it in a lower power mode when it determines that sufficient power is not being generated for the current mode of operation.

In one embodiment, the present invention enables converting a traditional paper based traditional plaque to be converted into a digital plaque, by providing an attachable solar power renewable energy power unit 215 on the top and/or sides of the old frame of the traditional plaque, replacing the paper document by the attachable e-paper based display unit 213 (mounting it as a panel inside the frame), attaching the motion detector unit 223 into a slot provided on the solar power renewable energy power unit 215, attaching the narrow thin cable between the solar power renewable energy power unit 215 and the e-paper based display unit 213, and loading the digital image of the paper document (for example, receiving it from an external scanner device. Thus, a traditional plaque can be converted into a digital plaque by the attachable components provided by the present invention, with some components integrated into some of the others, wherein the attachable components are, in one related embodiment:

attachable solar power renewable energy power unit 215
e-paper based display unit 213
motion detector unit 223, and
attaching the narrow thin cable (a wire to carry control signals and electrical power, or an USB connection/cable in some embodiments) between the solar power renewable energy power unit 215 and the e-paper based display unit 213.

In some embodiments, the motion detector unit 223 and the renewable energy power unit 215 are integrated into one package. Other configurations of physically packaging of functionality are contemplated.

Figure 3:
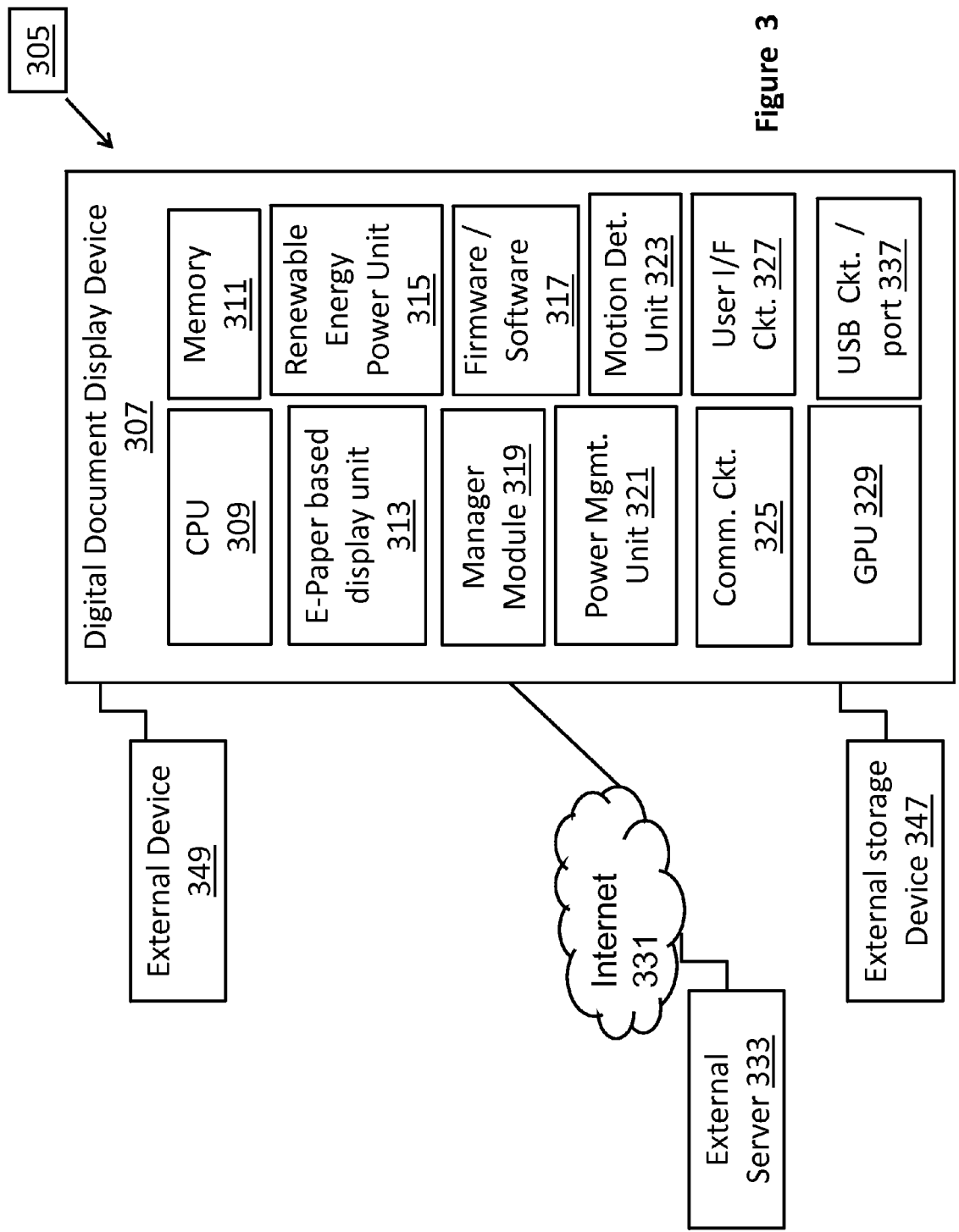
FIG. 3 is a digital document display device comprising an e-paper based display unit, a communication circuitry to retrieve a digital document and updates to the digital document for display, a CPU and a GPU.

FIG. 3 is a digital document display device 307 comprising an e-paper based display unit 313, a communication circuitry 325 to retrieve a digital document and updates to the digital document for display, a CPU 309 and a GPU 329. The CPU 309 is operable to execute a manager module 319 that manages the various interactions between the various components of the digital document display device 307. The GPU 329 controls display of documents and various types of media on the e-paper based display unit 313. A user interface circuitry 327 facilitates interaction by a user. It receives a first trigger, from a user and communicates it to the CPU 309. The CPU 309 is also capable of receiving the first trigger from a timer set to a first duration of time. The CPU 309 responds to the first trigger by powering off or transitioning to a low power mode both the communication circuitry 325 and the CPU 309, while keeping the GPU 329 and the user interface circuitry 327 powered, to continue displaying the digital document on the e-paper based display unit 313 and to continue facilitating interactions by the user.

The user interface circuitry 327 receives a second trigger from a user when the CPU 309 is powered off or in a low power mode and communicates it to the CPU 309 which responds by powering on or transitioning to a normal power mode, as necessary, in order to process user inputs. The CPU 309, if necessary, processes the user inputs and powers up the communication circuitry 325 to a normal mode if it determines that it needs it to retrieve a new document specified by the user for display, to change the digital document currently displayed or to retrieve an update to the digital document currently displayed.

In one embodiment, the CPU 309 of the digital document display device 307 sets a timer to a second duration of time, at the end of which the CPU 309 powers down or transitions the GPU 329 and the e-paper based display unit 313 to a low power mode. The digital document display device 307 also comprises a motion detector circuitry 323 that, upon detection of motion, communicates a third trigger to the CPU 309, which responds first by transitioning the e-paper based display unit 313 to a normal operational mode if it is currently powered down or operating in a low power mode, then by causing the e-paper based display unit 313 to display the digital document, and finally by powering off or transitioning to a low power mode both the communication circuitry 325, and the CPU 309.

In one related embodiment, the CPU 309 sets a second timer to a third duration of time, at the end of which the CPU 309 instructs the motion detector circuitry 323 to determine if there is any motion in proximity. The motion detector circuitry 323, on failing to detect any motion in proximity when instructed, indicates/flags the same to the CPU 309. The CPU 309 causes the GPU 329 and the e-paper based display unit 313 to power down or to transition to a low power mode when the motion detector circuitry 323 indicates that it has failed to detect any motion in proximity. The CPU 309 instructs the motion detector circuitry 323 to periodically attempt to detect motion in proximity and communicate another trigger to the CPU 309 if it detects motion.

In another embodiment, the document display device also comprises the motion detector circuitry 323 that detects motion and communicates a third trigger to the CPU 309, which responds by
a) first transitioning the e-paper based display unit 313 to a normal operational mode if it is currently powered down or operating in a low power mode, then
b) causing the e-paper based display unit 313 to display the digital document, and finally
c) setting the timer to a default duration for triggering the first trigger subsequently.

In a different embodiment, the digital document display device also comprises a USB interface 337 (also referred to as USB circuitry/port 337) for power input and for external interactions with an external device 349, wherein external interactions comprises loading one or more documents for display, etc. The CPU 309 employs the USB interface 337 to retrieve the digital document from an external device 349 communicatively coupled to the USB interface 337. It displays the digital document and sets the timer to a first duration of time in order to receive the first trigger, at the occurrence of which the CPU 309 powers off or transitions to a low power mode. In one related embodiment, the CPU 309 employs the USB interface 337 to retrieve the digital document from an external storage device 347 communicatively coupled to the USB interface 337.

The digital document display device 307 comprises a memory 111 configured for storing a display image. It can store multiple documents, make them available for display, stores downloaded client applications, firmware/software if necessary, etc. The e-paper based display unit 313 is configured to read and display the display image. A motion detector unit 323 helps detect human motion, so that the digital document display device 307 may be set to a low power mode, or powered off, etc. if no humans are detected in the vicinity.

In one embodiment, the motion detector unit 323 comprises an infrared sensor configured for detecting infrared light, generating a first detecting signal when the infrared light is detected, and generating a second detecting signal when the detected infrared light is no longer detectable. The digital document display device is in a standby mode, for example, when no detecting signals are generated by the infrared sensor, indicating absence of any humans in its vicinity. It subsequently goes into a normal operation mode when the first detecting signal is generated by the infrared sensor indicating presence of a human.

Thus, in one embodiment, by detecting (using infrared light or microwaves, etc.) if one or more users are in proximity of the digital document display device 307, power consumption is managed. Powering off or entering into a low power mode such as a standby mode, if an infrared light is detected by the infrared sensor of the motion detector, for example. Thus the digital document display device 307 operates in a standby mode if no infrared light is detected and in a normal mode or a display mode, if infrared light is detected. The displayed document is retrieved from a memory circuit 311 (such as the main memory associated with the CPU 309 or even a secondary memory circuitry associated with a graphical processor 329). The display image of the currently selected document is displayed on a screen when the digital document display device 307 is in the display mode or normal mode.

In one embodiment, a display mode is when the only the e-paper based display unit 313 is active, and any communication circuitry 325, a CPU 309/processor, etc. are powered off or in a low power state. Normal mode is when the communication circuitry 325, the CPU 309/processor, any GPU 329/graphical processors, driver circuitry are operational, and not in low power or inactive states. A standby mode is when only the motion detector unit 323/circuitry is operational, at least periodically, and the CPU/processor 309, any GPU 329/graphical processors, and the e-paper based display unit 313 are all powered off or in low power states. Other operational modes are also contemplated that power off one or more of the components as needed, to save energy and to prolong the power currently available in the battery, etc.

The digital document display device 307, in one embodiment, also comprises a camera control circuitry (not shown) and further comprises an image processing circuitry configured to adjust an image captured, a data extracting circuitry configured to extract data from the captured image, and a comparator circuit configured to determine whether the captured image is identical to one or more reference documents/images. The camera control circuitry makes it possible to capture a digital image/a digital photo of a traditional paper document, so that is can be displayed on the e-paper based display unit 313, after optional image processing, cropping, image resizing, etc.

In one embodiment, a power circuit is configured to provide operational voltages to the various components such as the e-paper based display unit 313, the CPU 309, the GPU 329, the memory 111, motion detector unit 323 and the camera control circuit (not shown), if any. The digital document display device 307 is configured to switch to operating in a one of several supported modes based on user preference, based on control logic and based on power available in the renewable energy power unit 325/powered battery (such as solar powered battery backed up with small cell batteries such as AAA batteries).

Figure 4:
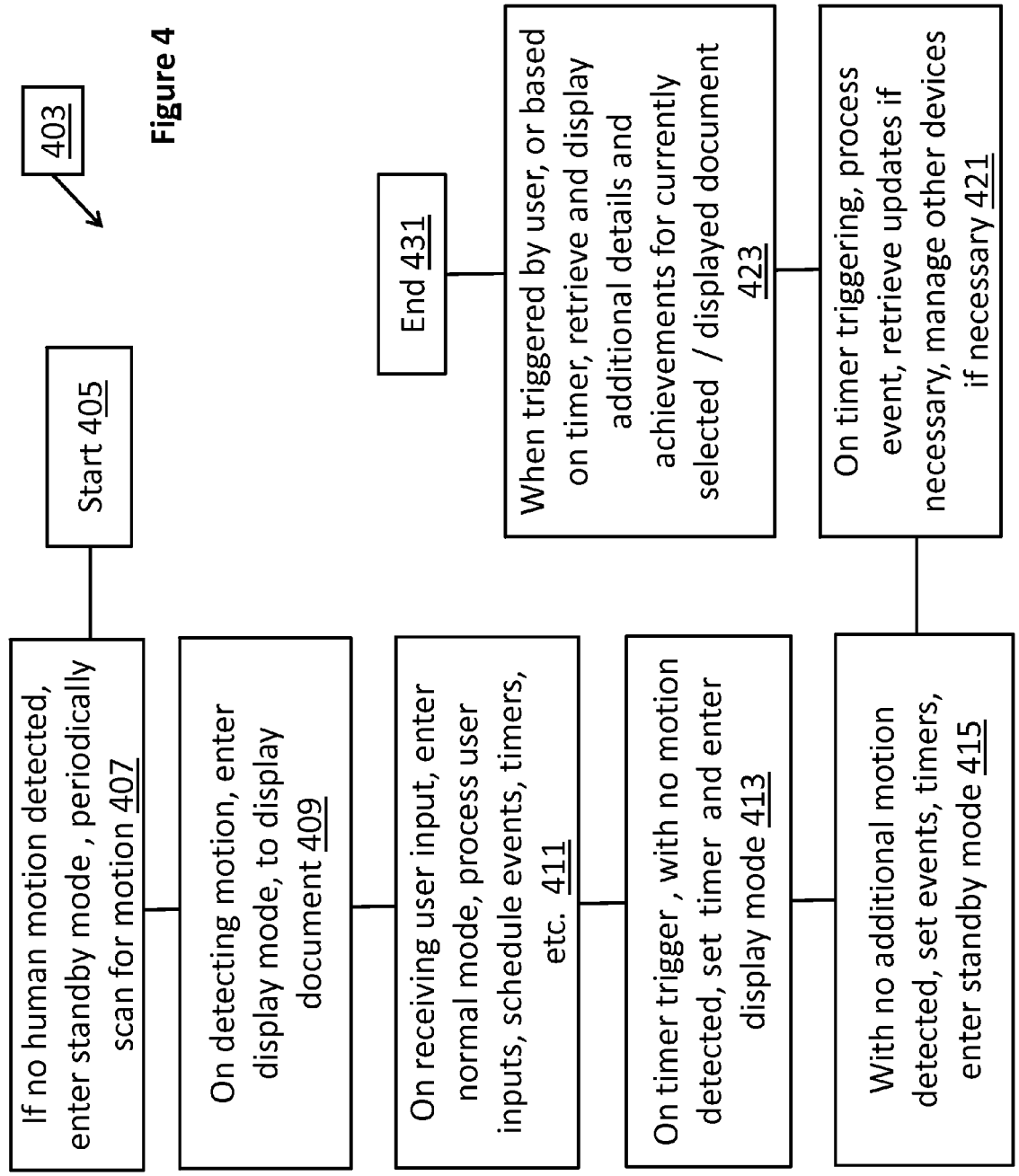
FIG. 4 is a flow chart of an exemplary operation of the digital document display device as it transitions between various operational modes to manage its power consumption, and to provide document display features.

FIG. 4 is a flow chart of an exemplary operation of the digital document display device 107 as it transitions between various operational modes to manage its power consumptions, and to provide document display features. At a start block 405, the processing begins in the digital document display device 107 when the CPU is powered up by a user or by an event that triggers it. Then, at a next block 407, if no human is detected, the digital document display device 107 enters a standby mode, and it configures the motion detector unit 123 to periodically scan for human motion 407.

Thus the digital document display device 107 operates in a standby mode if no infrared light is detected. A standby mode can also be entered for other reasons, such as low power availability (battery has run down), etc.

Then, at a next block 409, on detecting motion, it enters a display mode, to display a selected document. A display mode is when the only the e-paper based display unit 113 is active, and any communication circuitry 125, a CPU 109/processor, etc. are powered off or in a low power state. Later, at a next block 411, on receiving user input, the digital document display device 107 enters a normal mode. Normal mode is when the communication circuitry 125, the CPU 109/processor, any GPU 129/graphical processors, driver circuitry are operational, and not in low power or inactive states. It processes user inputs if any, schedules events, sets timers, etc. Events can be retrieval of updates, assigning documents for display (in same device or other devices in communicative proximity, etc.), changing a document currently being displayed, etc. Timers can be timers to trigger various management and maintenance activities, power management activities, etc.

Then, at a next block 413, on timer trigger being received, with no motion detected, the digital document display device 107 sets additional timers as necessary, and enters into a display mode. Then, at a next block 415, with no additional motion detected, it sets events, timers, as needed, and enters into a standby mode. A standby mode is when only the motion detector unit 123/circuitry is operational, at least periodically, and the CPU/processor 109, any GPU 129/graphical processors, and the e-paper based display unit 113 are all powered off or in low power states.

Subsequently, on a timer triggering, at a next block 421, it processes events as necessary, retrieves updates if necessary, manages other devices if necessary, etc. Then, at a next block 423, when triggered by user, or based on timer trigger, it retrieves and displays additional details and achievements associated with currently displayed/currently selected document.

Processing finally terminates at an end block 431.

Figure 5:
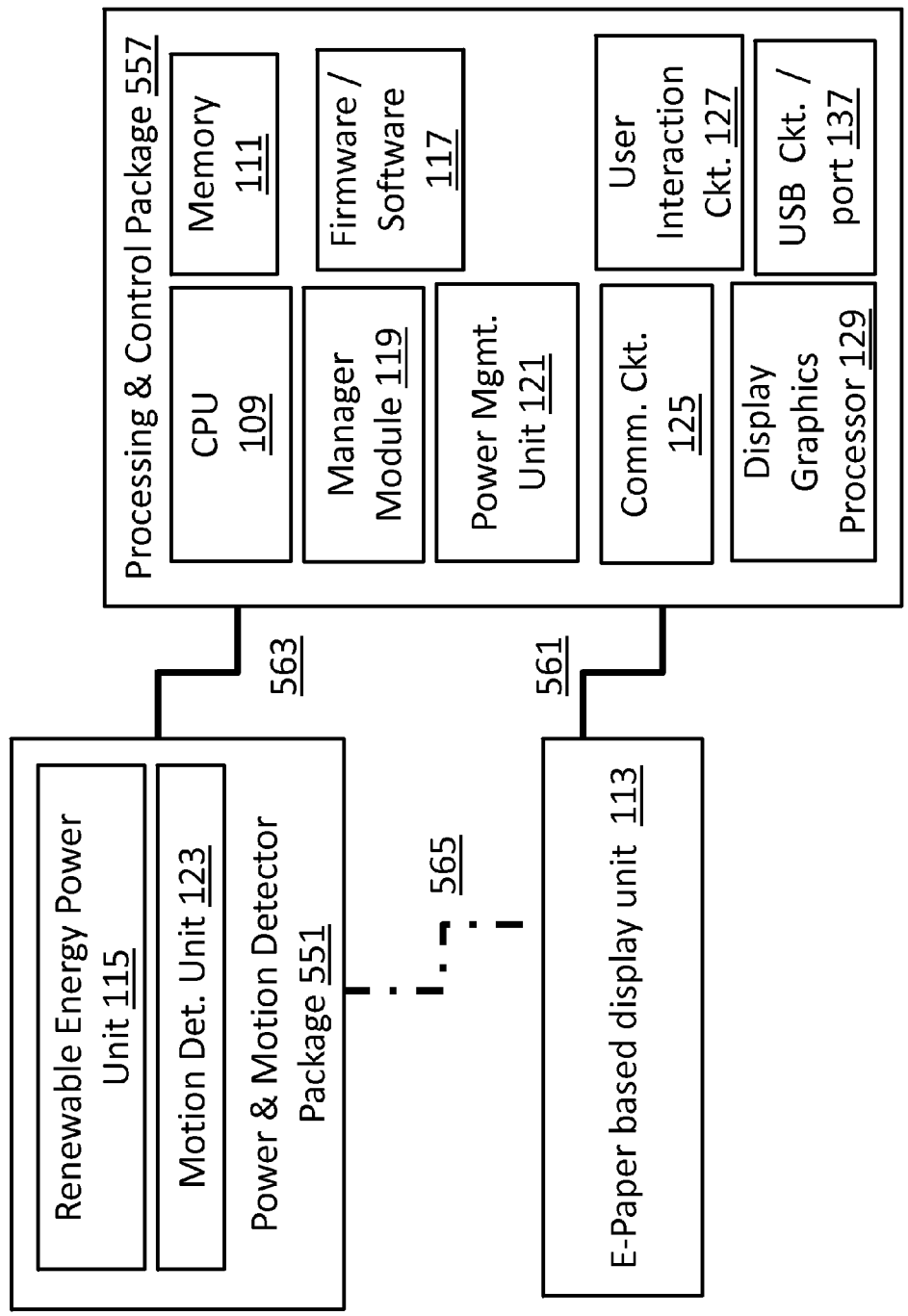
FIG. 5 is a perspective block diagram of an exemplary packaging of various components of the digital document display device of FIG. 1 that is used to convert a traditional plaque into a digital plaque.

FIG. 5 is a perspective block diagram of an exemplary packaging of various components of the digital document display device 107 of FIG. 1 that is used to convert a traditional plaque into a digital plaque. The renewable energy power unit 115 and the motion detector unit 123 are integrated into a power & motion detector package 551, which can be mounted on any side of a traditional plaque, preferably on a top rail/top side of a traditional plaque (that has wood or metallic frame, with 4 sides—top, bottom, left and right sides). The e-paper based display unit 113 is a panel that replaces a paper document within the frame of the traditional plaque. The processing & control package 557 comprises the other components of the digital document display device 107 of FIG. 1, such as the CPU 109, display graphics processor 129, communication circuitry 125, user interaction circuitry 127, manager module 119, memory 111, firmware/software 117, and power management unit 121.

The processing & control package 557 is communicatively and electrically connected to the power & motion detector package 551, and it receives power (such as 5V voltage at 0.3 A current, for example) over a cable 563. The e-paper based display unit 113 is communicatively and electrically connected to the processing & control package 557 over a cable 561. In some embodiments, the e-paper based display unit 113 is also communicatively and electrically connected to the power & motion detector package 551 over cable 565.

The packaging recommended in this FIG. 5 is for exemplary purposes and it should be clear that other combinations of components/packaging are possible in alternate arrangements of components, in alternative designs, etc.

Figure 6:
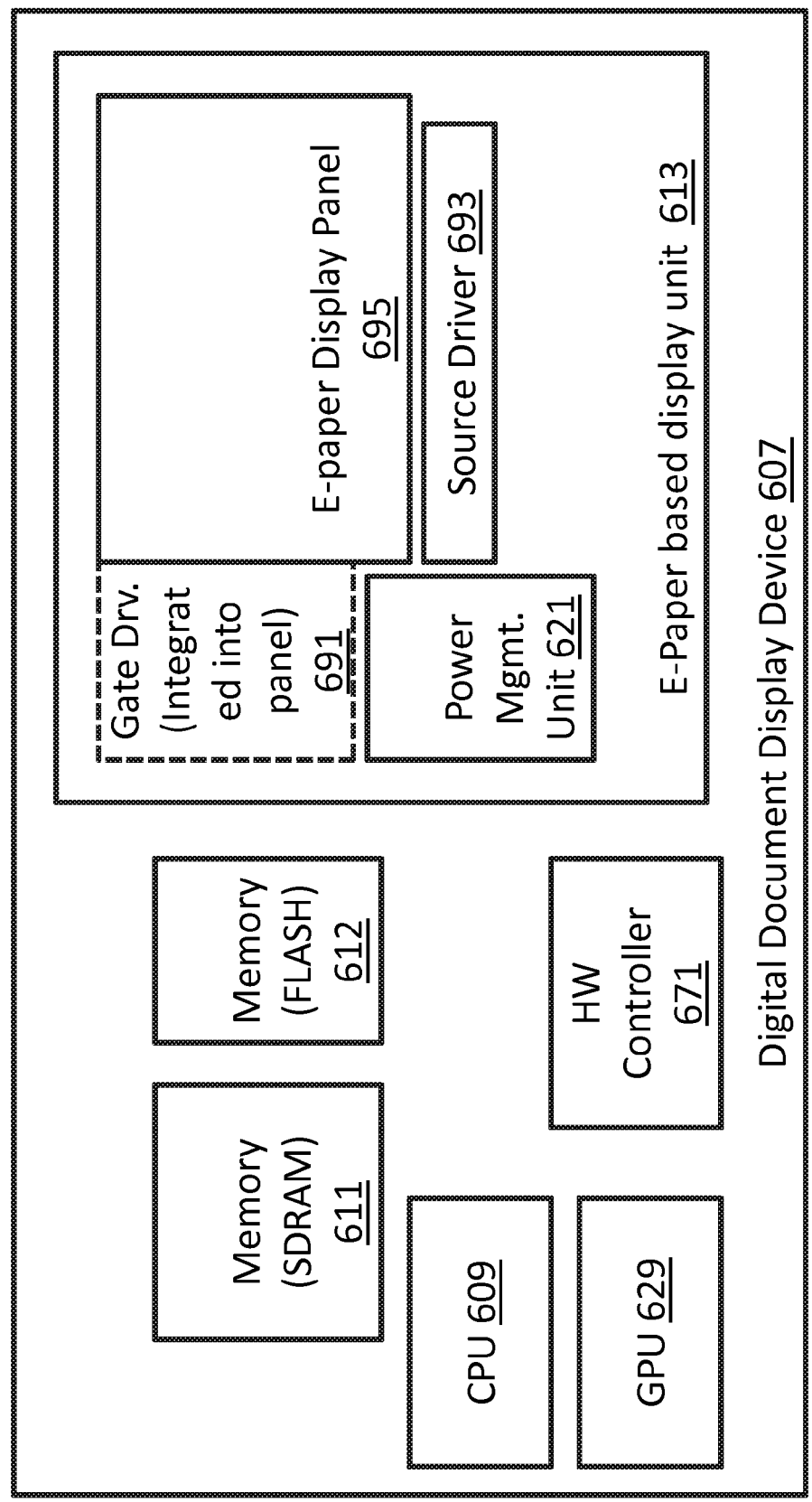
FIG. 6. is a perspective block diagram of another digital document display device 607 that employs an e-paper based display unit 613 to display a digital document.

FIG. 6. is a perspective block diagram of another digital document display device 607 that employs an e-paper based display unit 613 to display a digital document. The digital document display device 607 comprises a CPU 609, a GPU 629, a SDRAM based memory 611, a FLASH based memory 612, a hardware controller 671 and the e-paper based display unit 613.

The e-paper based display unit 613 comprises a an e-paper display panel 695, a source driver 693 that drives source lines, a gate driver 691 integrated into the e-paper display panel 695 that drives gate lines, and a power management unit 621 that decides when to turn a low power mode on in the e-paper display panel 695, when to turn the e-paper display panel 695 off, when to change the resolution of the e-paper display panel 695 to save power, etc.

The FLASH memory is used to store documents that are to be displayed, to store download client applications, such as a downloaded version of the manage module 119, to store user preferences, configurations, timer information, support documents, media, or references to other documents associated with the displayed documents, user credentials, subscription information, etc.

The hardware controller 671 facilitates:
control of the hardware and system power management
customize the digital document display device 607
prolong the battery lifetime
cool down the system and reduce power consumption
monitor the hardware to avoid system failure The terms "circuit" and "circuitry" as used herein may refer to an independent circuit or to a portion of a multi-functional circuit that performs multiple underlying functions. For example, depending on the embodiment, processing circuitry may be implemented as a single chip processor or as a plurality of processing chips. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

As one of ordinary skill in the art will appreciate, the terms "plaque" and "digital plaque" as may be used herein, comprise a wall mountable or a table mountable display screen made from LCD screens (thin film for example), LED screens, OLED screens, etc. that can be put up on a wall, or installed on a flat surface like a table top, desk etc. As one of ordinary skill in the art will also appreciate, such digital plaques can be managed by a user using an associated remote control, soft buttons and menu items displayed, physical buttons, keyboard, a game controller with joystick, voice commands (where a voice recognition software tool is available), gesture recognition tool, or using touch screen commands on a touch sensitive screen available/deployed on the digital plaque.

As one of ordinary skill in the art will appreciate, the terms "user interaction circuitry" as may be used herein, include user interaction means implemented through use of user interaction chipsets, associated wiring, user data entry means (such as hardkeys, soft keys, touch-sensitive input circuits, etc.) and corresponding firmware, drivers and software.

As one of ordinary skill in the art will appreciate, the updateable document that is displayed by the digital plaque can also be a poster, an advertisement, a travel brochure, and other types of documents that people typically get framed and hang on a wall.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A digital document display device, comprising:
a processor;
a memory;
an e-paper based display unit;
a renewable energy power unit;
a motion detection unit coupled to the e-paper based display unit and the renewable energy power unit, to detect motion of humans in proximity, wherein the motion detection unit triggers the processor to display a first digital document at a lower resolution or a higher resolution based on motion detected, or if there is need to conserve power or lower power consumption;
the processor sets at least the e-paper based display unit in one of a plurality of normal operating modes and displays the first document when at least one human is detected in its vicinity by the motion detection unit;

the processor sets at least the e-paper based display unit in one of a plurality of low power operating modes when no human is detected in its vicinity by the motion detection unit;
the processor adding other display devices discovered to be in communicative proximity, to a group of display devices that are managed by the digital document display device, and assigning documents to the group of display devices for display; and
the processor receiving and processing a request to join the group of display devices managed.

2. The digital document display device of claim 1, further comprising:
a power management unit electrically coupled to the processor, the memory, the e-paper based display device and the renewable energy power unit; and
the power management unit modifies or turns off the power supplied to the various components of the digital document display device based on the one of a plurality of operating modes assigned or set by the processor.

3. The digital document display device of claim 1, further comprising:
a communication circuitry for interacting with at least one server;
the processor, operable to execute a manager module, retrieves an updated status for the first digital document employing the communication circuitry, and displays it along with other related documents, supplementary information, and contextual information; and
the manager module selectively presents a prompt to the user recommending or soliciting at least one user input or user action selection, gathers a user response and conducts a user specified operation based on the user response.

4. The e-paper based display unit of claim 1, further comprising:
a liquid crystal panel having a pixel array;
a gate driver unit for generating a plurality of driving signals to drive the pixel array, wherein the gate driver unit is disposed on the liquid crystal panel such that it provides driving signals to drive the pixel array;
a clock generator electrically coupled to the gate driver unit, wherein an output of the clock generator is managed to adjust driving signals generated from the gate driver unit; and
a controllable power management unit electrically coupled to the gate driver unit and the clock generator, the power management unit capable of adjusting power consumption by the e-paper based display unit enabling a user to trade image quality for power consumption.

5. The digital document display device of claim 1, further comprising:
a power management unit communicatively coupled to the e-paper based display unit, the processor, the renewable energy power unit and the motion detection unit;
the power management unit determining the need to conserve power consumption and triggering the processor to display the first digital document at a lower resolution; and
the power management unit determining an availability of adequate power and triggering the processor to display the first digital document employing a default resolution or a higher resolution.

6. The digital document display device of claim 1, further comprising:

the renewable energy power unit disposed along or disposed on one or more surfaces of the digital document display device;
the motion detection unit disposed on a frontal surface to detect motion of humans in proximity, wherein the motion detection unit, on detecting motion of humans, triggers the processor to activate the display of the first digital document if the e-paper based display unit has been turned off or has been placed in a low power mode; and
the renewable energy power unit triggers the processor to turn off the e-paper based display unit or place it in a lower power mode when it determines that sufficient power is not being generated for the current mode of operation.

7. A digital document display device comprising:
an e-paper based display unit;
a communication circuitry to retrieve a digital document and updates to the digital document for display;
a CPU that is operable to execute a manager module that manages the various interactions between the various components of the digital document display device;
a GPU that controls display of documents and various types of media on the e-paper based display unit; and
a user interface circuitry that facilitates interaction by a user; and
the user interface circuitry receiving a first trigger, from a user, communicating it to the CPU;
the CPU also capable of receiving the first trigger from a timer set to a first duration of time;
the CPU responds to the first trigger by powering off or transitioning to a low power mode both the communication circuitry and the CPU, while keeping the GPU and the user interface circuitry powered, to continue displaying the digital document on the e-paper based display unit and to continue facilitating interactions by the user; and
the CPU adding other display devices discovered to be in communicative proximity, to a group of display devices that are managed by the digital document display device, and assigning documents to the group of display devices for display; and
the CPU receiving and processing a request to join the group of display devices managed.

8. The digital document display device of claim 7 further comprising:
the user interface circuitry receiving a second trigger from a user when the CPU is powered off or in a low power mode and communicating it to the CPU which responds by powering on or transitioning to a normal power mode, as necessary, in order to process user inputs; and
the CPU, if necessary, processing the user inputs and powering up the communication circuitry to a normal mode if it determines that it needs it to retrieve a new document specified by the user for display, to change the digital document currently displayed or to retrieve an update to the digital document currently displayed.

9. The digital document display device of claim 7 further comprising:
the CPU, setting a timer to a second duration of time, at the end of which the CPU powers down or transitions the GPU and the e-paper based display unit to a low power mode; and
a motion detector circuitry that, upon detection of motion, communicates a third trigger to the CPU, which responds first by transitioning the e-paper based display unit to a normal operational mode if it is currently powered down or operating in a low power mode, then by causing the e-paper based display unit to display the digital document, and finally by powering off or transitioning to a low power mode both the communication circuitry, and the CPU.

10. The digital document display device of claim 9 further comprising:

the CPU setting a second timer to a third duration of time, at the end of which the CPU instructs the motion detector circuitry to determine if there is any motion in proximity;

the motion detector circuitry, on failing to detect any motion in proximity when instructed, indicating the same to the CPU;

the CPU causing the GPU and the e-paper based display unit to power down or to transition to a low power mode when the motion detector circuitry indicates that it has failed to detect any motion in proximity; and the CPU instructing the motion detector circuitry to periodically attempt to detect motion in proximity and communicate another trigger to the CPU if it detects motion.

11. The digital document display device of claim 7 further comprising:

a motion detector circuitry that detects motion and communicates a third trigger to the CPU, which responds by first transitioning the e-paper based display unit to a normal operational mode if it is currently powered down or operating in a low power mode, then causing the e-paper based display unit to display the digital document, and finally setting the timer to a default duration for triggering the first trigger subsequently.

12. The digital document display device of claim 7 further comprising:

a USB interface for power input and for external interactions with an external device, wherein external interactions comprises loading one or more documents for display;

the CPU employing the USB interface to retrieve the digital document from an external device communicatively coupled to the USB interface; and the CPU displaying the digital document and setting the timer to a first duration of time in order to receive the first trigger, at the occurrence of which the CPU powers off or transitions to a low power mode.

* * * * *